United States Patent
Taguchi et al.

(10) Patent No.: US 6,465,607 B2
(45) Date of Patent: Oct. 15, 2002

(54) VIBRATION DAMPING RUBBER MEMBER HAVING EXCELLENT DURABILITY AND METHOD OF PRODUCING THE SAME

(75) Inventors: Takehiko Taguchi; Ako Yoshikawa; Shinji Iio, all of Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/870,054

(22) Filed: May 30, 2001

(65) Prior Publication Data

US 2002/0010276 A1 Jan. 24, 2002

(30) Foreign Application Priority Data

Jun. 16, 2000 (JP) ........................ 2000-181264

(51) Int. Cl.$^7$ ................................................. C08F 6/00
(52) U.S. Cl. ...................................................... 528/480
(58) Field of Search ......................................... 528/480

(56) References Cited

U.S. PATENT DOCUMENTS

| | | | |
|---|---|---|---|
| 3,153,008 A | 10/1964 | Fox | 528/106 |
| 3,833,689 A | 9/1974 | Usamoto et al. | |
| 4,182,726 A | 1/1980 | Illuminati et al. | 528/196 |
| 4,218,391 A | 8/1980 | Romano et al. | 528/196 |
| 4,318,862 A | 3/1982 | Romano et al. | 528/196 |
| 4,360,659 A | 11/1982 | Sikdar | 528/196 |
| 5,210,269 A | 5/1993 | Di Muzio et al. | 558/277 |
| 5,527,943 A | 6/1996 | Rivetti et al. | 528/196 |
| 5,536,864 A | 7/1996 | Paret et al. | 558/277 |
| 5,670,006 A | 9/1997 | Wilfong et al. | 156/236 |
| 5,723,192 A | 3/1998 | Jonasz | 428/64.1 |
| 6,268,427 B1 | 7/2001 | Wang et al. | 524/504 |

FOREIGN PATENT DOCUMENTS

| | | |
|---|---|---|
| DE | 1 229 294 | 11/1966 |
| JP | 5-44776 | 2/1993 |
| JP | 6-65422 | 3/1994 |
| WO | 00/34383 | 6/2000 |
| WO | 01/32769 A1 | 5/2001 |

OTHER PUBLICATIONS

U.S. patent application Ser. No. 09/868,145, Taguchi et al., filed Jun. 15, 2001.

*Primary Examiner*—Terressa M. Boykin
(74) *Attorney, Agent, or Firm*—Burr & Brown

(57) ABSTRACT

A vibration damping rubber member having excellent durability, wherein an improvement includes: the vibration damping rubber member being obtained by vulcanizing a composition in which an unvulcanized natural rubber material and an unvulcanized acrylic rubber material are evenly mixed together in a proportion of 90/10~60/40 by weight. Upon vulcanization, fine particles of a vulcanized acrylic rubber having a size of 1~100 μm, obtained by vulcanization of the unvulcanized acrylic rubber material are dispersed in a matrix phase of a vulcanized natural rubber, which is obtained by vulcanization of the unvulcanized natural rubber material. A method of producing the vibration damping rubber member is also disclosed.

14 Claims, No Drawings

VIBRATION DAMPING RUBBER MEMBER HAVING EXCELLENT DURABILITY AND METHOD OF PRODUCING THE SAME

This application is based on Japanese Patent Application No. 2000-181264 filed Jun. 16, 2000, the contents of which are incorporated hereinto by reference.

BACKGROUND OF THE INVENTION

1. Field of the Invention

The present invention relates to a vibration damping rubber member capable of exhibiting excellent durability and a method of producing the same, and more particularly to a vibration damping rubber member which contributes to reduction of the weight of automotive vehicles when the vibration damping rubber member is used on the automotive vehicles, and a method suitable for producing such a vibration damping rubber member.

2. Discussion of Related Art

As well known, a vibration damping rubber member interposed between two members in a vibration or shock transmitting system so as to exhibit vibration damping or cushioning characteristics has been widely used in various fields. For instance, the vibration damping rubber member is used on automotive vehicles, as engine mounts, body mounts, cab mounts, member mounts, strut mounts, strut bar cushions, suspension bushings, and so on.

The automotive vehicles on which such a vibration damping rubber member is installed are generally required to have a reduced weight in order to improve fuel economy and to achieve high performance. The vibration damping rubber member used on the automotive vehicles is accordingly required to have a reduced weight.

As one technique for reducing the weight of the vibration damping rubber member interposed between two members in the vibration or shock transmitting system, two supporting or mounting members for supporting the vibration damping rubber member which are attached to the respective two members in the vibration system are formed of an aluminum material or a resin material in place of a conventionally used metallic material. As another technique, the vibration damping rubber member is designed to have a reduced size. In the vibration damping rubber member which is made compact to reduce its weight, the volume (amount) of the rubber is inevitably smaller than that in a conventional vibration damping rubber member. Accordingly, the material used for the vibration damping rubber member whose size is reduced needs to exhibit a considerably high degree of durability for withstanding a vibrational load as large as that applied to the conventional vibration damping rubber member.

DISCLOSURE OF THE INVENTION

The present invention is made in view of the background art described above. It is a first object of this invention to provide a vibration damping rubber member which is capable of exhibiting excellent durability without suffering from deterioration of its spring stiffness.

It is a second object of the invention to provide a method suitable for producing such a vibration damping rubber member.

The first object indicated above may be achieved according to a first aspect of the present invention, which provides a vibration damping rubber member having excellent durability, wherein an improvement comprises: the vibration damping rubber member being obtained by vulcanizing a composition in which an unvulcanized natural rubber material and an unvulcanized acrylic rubber material are evenly mixed together in a proportion of 90/10~60/40 by weight; and fine particles of a vulcanized acrylic rubber having a size of 1~100 $\mu$m and obtained by vulcanization of the unvulcanized acrylic rubber material being dispersed in a matrix phase of a vulcanized natural rubber obtained by vulcanization of the unvulcanized natural rubber material.

The vibration damping rubber member constructed according to the first aspect of the present invention is characterized in that a suitable amount of the fine particles of the vulcanized acrylic rubber obtained by vulcanization of the unvulcanized acrylic rubber material are dispersed in a matrix phase of the vulcanized natural rubber obtained by vulcanization of the natural rubber material. In the thus formed vibration damping rubber member, the acrylic rubber dispersed in the form of the fine particles in the matrix phase of the natural rubber permits even distribution of the load applied to the vibration damping member. Accordingly, the present vibration damping rubber member exhibits significantly improved durability without suffering from deterioration of its spring stiffness (dynamic/static ratio of spring constant).

The vibration damping rubber member of the present invention is obtained by vulcanization of the composition in which the unvulcanized natural rubber material and the unvulcanized acrylic rubber material are mixed in a proportion of 90/10~60/40 by weight. In the formed vibration damping rubber member, the fine particles of the vulcanized acrylic rubber having a size of 0.1~100 $\mu$m and obtained by vulcanization of the unvulcanized acrylic rubber material are dispersed in the matrix phase of the vulcanized natural rubber obtained by vulcanization of the unvulcanized natural rubber material. According to this structure, the vibration damping rubber member effectively exhibits improved durability while assuring physical properties required by the vibration damping rubber member.

The second object indicated above may be achieved according to a second aspect of the present invention, which provides a method of producing a vibration damping rubber member, the method comprising the steps of: preparing an unvulcanized rubber composition by evenly mixing together an unvulcanized natural rubber material and an unvulcanized acrylic rubber material in a proportion of 90/10~60/40 by weight, and adding a vulcanizing agent for vulcanizing the unvulcanized natural rubber material and a vulcanizing agent for vulcanizing the unvulcanized acrylic rubber material; forming a thus obtained mixture into a desired shape; and vulcanizing the formed mixture for obtaining the vibration damping rubber member in which fine particles of a vulcanized acrylic rubber having a size of 0.1~100 $\mu$m and obtained by vulcanization of the unvulcanized acrylic rubber material are dispersed in a matrix phase of a vulcanized natural rubber obtained by vulcanization of the unvulcanized natural rubber material.

The present method of producing a vibration damping rubber member permits the vulcanized acrylic rubber obtained by vulcanization of the unvulcanized acrylic rubber material to be evenly dispersed in the form of the fine particles in the matrix phase of the vulcanized natural rubber obtained vulcanization of the unvulcanized natural rubber. Accordingly, the vibration damping rubber member having a high degree of durability can be advantageously produced according to the present invention.

DETAILED DESCRIPTION OF THE PREFERRED EMBODIMENT

The vibration damping rubber member according to the present invention constructed as described above is constituted by an intimate mixture of a vulcanized natural rubber and a vulcanized acrylic rubber, which is obtained by vulcanization of a natural rubber material and an acrylic rubber material known in the art. The present vibration damping rubber member is characterized in that the fine particles of the vulcanized acrylic rubber having a size of 0.1~100 µm are dispersed in the matrix phase of the vulcanized natural rubber.

The unvulcanized natural rubber material and the unvulcanized acrylic rubber material used for forming the present vibration damping rubber member are both polymers which are mutually incompatible. In the vibration damping rubber member obtained by vulcanization of the two unvulcanized rubber materials which ate mixed together in a predetermined proportion, the vulcanized natural rubber and the vulcanized acrylic rubber are not mutually compatible. In the present vibration damping rubber member, the vulcanized acrylic rubber is dispersed, in the matrix phase of the vulcanized natural rubber, in the form of fine particles having a size of 0.1~100 µm. The fine particles of the vulcanized acrylic rubber dispersed in the matrix phase of the vulcanized natural rubber are effective to distribute and reduce the load applied to the vibration damping member, for thereby considerably improving the durability of the vibration damping member. It is preferable that the fine particles of the vulcanized acrylic rubber have a size of not larger than 10 µm for further improved durability of the vibration damping member. The size of the fine particles of the vulcanized acrylic rubber exceeding the upper limit of 100 µm adversely influences the physical properties such as breaking elongation of the vibration damping member. The particle size of the vulcanized acrylic rubber may be measured by various known methods. For instance, the particles of the vulcanized acrylic rubber are observed by a scanning electron microscope (SEM) or a scanning probe microscope (SPM), to measure the sizes of the particles.

For permitting the vibration damping rubber member formed as the end product to exhibit the desired operating characteristics or physical properties, the ratio of the weight of the unvulcanized natural rubber material to that of the unvulcanized acrylic rubber material is selected within a range between 90/10 and 60/40. If the amount of the unvulcanized acrylic rubber material is excessively smaller than that of the unvulcanized natural rubber material, the produced vibration damping rubber member does not enjoy the effect to be obtained by addition of the unvulcanized acrylic rubber material. If the amount of the unvulcanized acrylic rubber material is excessively larger than that of the unvulcanized natural rubber material, on the other hand, the physical properties such as permanent compressive strain of the vibration damping rubber member may be deteriorated. Where the amount of the unvulcanized acrylic rubber material is extremely larger than that of the unvulcanized natural rubber material, the vulcanized acrylic rubber, rather than the vulcanized natural rubber, may undesirably be a matrix phase in the produced vibration damping rubber member. In this case, the vibration damping rubber member may not have the desired structure described above and the desired properties required by the vibration damping rubber member.

In the present invention, the natural rubber material and the acrylic rubber material need to be mixed together in an unvulcanized state. If a vulcanized acrylic rubber instead of the unvulcanized acrylic rubber is mixed with the unvulcanized natural rubber, it is speculated that the vibration damping rubber member to be produced by vulcanization of the thus obtained mixture does not have satisfactory physical properties such as breaking elongation required by the vibration damping rubber member, due to a considerably small degree of interaction at an interface between the natural rubber and the acrylic rubber. In other words, the produced vibration damping rubber member is not constituted by an intimate mixture of the vulcanized natural rubber and the vulcanized acrylic rubber.

The natural rubber material and the acrylic rubber material used for producing the present vibration damping rubber member are suitably selected from among those known in the art. For instance, the acrylic rubber material may be selected as needed, depending upon the desired characteristics required by the vibration damping member, from among any known synthetic rubber materials whose major component is alkyl acrylate. In particular, it is preferable to use acrylic rubber materials which can be vulcanized with a polyamine-based vulcanizing agent which will be described. For instance, it is preferable to use a copolymer (ACM) of alkyl acrylate and 2-chloroethyl vinyl ether, a copolymer (ANM) of alkyl acrylate and acrylonitrile, and a copolymer (VAMAC-G) of methyl acrylate and ethylene.

In producing the present vibration damping rubber member having the intended structure by using the unvulcanized natural rubber material and the unvulcanized acrylic rubber material described above, suitable amounts of known vulcanizing agents suitable for vulcanizing the respective rubber materials are added to the mixture of the unvulcanized rubber materials prior to its vulcanization. As the vulcanizing agent for vulcanizing the unvulcanized natural rubber material, a sulfur-based vulcanizing agent such as sulfur is generally used, so that the unvulcanized natural rubber material is vulcanized by a known sulfur-based vulcanizing system. The vulcanizing agent for vulcanizing the unvulcanized acrylic rubber material is suitably selected from among any known vulcanizing agents depending upon the kinds of the acrylic rubber material to be used. For instance, the polyamine-based vulcanizing agent such as hexamethylene diamine carbamate or triethylene tetramine is used.

In the present invention, at least one selected vulcanization promoting agent and/or aid may be used in combination with the respective vulcanizing agents for vulcanizing the two unvulcanized rubber materials. The appropriate vulcanization promoting agent(s) and/or aid(s) is/are selected depending upon the specific unvulcanized rubber material (the unvulcanized natural rubber material or the unvulcanized acrylic rubber material) and the specific vulcanizing agent. The selected at least one vulcanization promoting agent and/or aid is mixed and kneaded in a suitable amount with the specific unvulcanized rubber material and the specific vulcanizing agent, so that the unvulcanized rubber material is vulcanized with an improved result.

Typical examples of the vulcanization promoting agent include: sulfenamides such as N-tert-butyl-2-benzothiazolylsulfenamide (BBS), N-cyclohexyl-2-benzothiazolylsulfenamide (CBS), and N-oxydiethylene-2-benzothiazolylsulfenamide (OBS); dithiocarbamates such as zinc dimethyldithiocarbamate (ZnMDC) and zinc diethyldithiocarbamate (ZnEDC); and thiurams such as tetramethyl thiuram disulfide (TMTD), tetraethyl thiuram disulfide (TETD), and tetrabutyl thiuram disulfide (TBTD). As the vulcanization promoting aid, zinc oxide or stearic acid is used, for instance.

Various other suitable known additives may be added to the unvulcanized rubber materials, as needed. Those additives may include: reinforcing agents such as carbon black; anti-aging agents such as wax; and softening agents such as oil. It is noted that these additives should not prevent the produced vibration damping rubber member from exhibiting the desired physical properties and operating characteristics and the amounts of the additives should be determined so as not to deteriorate those physical properties and operating characteristics of the vibration damping rubber member.

In producing the present vibration damping rubber member, various methods known in the art can be employed. In the present invention, the unvulcanized natural rubber material and the unvulcanized acrylic rubber material are mixed in a suitable ratio by weight, i.e., the ratio of the weight of the natural rubber material to that of the acrylic rubber material=90/10~60/40, and the mixture is introduced into a suitable known kneader or mixer such as a banbury mixer or a mixer of roll type, so that the mixture is evenly kneaded. To this mixture, the vulcanizing agents for vulcanizing the respective unvulcanized rubber materials and the suitably selected additives are added and kneaded, so as to provide an unvulcanized rubber composition in which the unvulcanized acrylic rubber material is evenly dispersed in the form of fine particles having a predetermined size in the unvulcanized natural rubber material. Subsequently, the thus obtained unvulcanized rubber composition is formed into a desired shape by a suitable molding method using a molding die, for instance, at a suitably determined temperature at which the unvulcanized natural rubber material and the unvulcanized acrylic rubber material are concurrently vulcanized. Thus, the intended vibration damping rubber member is produced.

The order of introducing, into the kneader, the unvulcanized natural rubber material, unvulcanized acrylic rubber material, vulcanizing agents for the respective unvulcanized rubber materials, and additives is not limited to that described above. For instance, all components may be simultaneously introduced into the kneader or mixer. Alternatively, all components except the vulcanizing agents are introduced into the kneader or mixer for preliminary kneading, and the vulcanizing agents may be added in a subsequent step of finish kneading. Namely, the components are mixed together such that the unvulcanized natural rubber material and the unvulcanized acrylic rubber material are vulcanized concurrently, or successively after the vulcanizing agents have been added.

The kneading operation is effected at a suitable temperature for a suitable time period. In the present invention, in order to establish the desired state of dispersion of the fine particles of the acrylic rubber material, the kneading time is determined in view of the specific kinds and the amounts of the natural rubber material and the acrylic rubber material, and the operating characteristic of the kneader.

In molding and vulcanizing the unvulcanized rubber composition, the vulcanizing condition such as the temperature, pressure and time is suitably determined depending upon the specific kinds of the unvulcanized natural rubber material, the unvulcanized acrylic rubber material, and the vulcanizing agents, for achieving effective vulcanization of those unvulcanized rubber materials. The molding and vulcanizing operation may be effected according to any known manner such as a press-molding and -vulcanizing process in which the molding and the vulcanization are effected concurrently. The vibration damping rubber member to be produced may be provided with a metallic structure made of a ferrous or aluminum material, which may be bonded to the rubber member during or after the molding and vulcanizing operation. In this respect, it is to be understood that the method of the present invention is applicable to not only a vibration damping rubber member without such a metallic structure, but also a vibration damping rubber member with such a metallic structure bonded thereto. It is also to be understood that the configuration and size of the vibration damping rubber member to be produced by vulcanization of the unvulcanized natural rubber material and the unvulcanized acrylic rubber material are not particularly limited, but may be suitably determined depending upon the desired characteristics and application of the vibration damping rubber member.

The vibration damping rubber member produced as described above is interposed between two members in a vibration or shock transmitting system of an automotive vehicle, so as to function as an engine mount, body mount, cab mount, member mount, strut mount, strut bar cushion, suspension bushing, and so on. Since the present vibration damping rubber member can be made compact owing to the significantly improved durability, the automotive vehicle on which the present vibration damping rubber member is installed has an advantageously reduced weight.

EXAMPLES

To further clarify the present invention, some examples of the present invention will be described. It is to be understood that the present invention is not limited to the details of these examples, but may be embodied with various changes, modifications and improvements, other than the following examples and the details of the foregoing descriptions, which may occur to those skilled in the art, without departing from the spirit of the invention defined in the attached claims.

Initially, an unvulcanized natural rubber (NR) material and an unvulcanized acrylic rubber material (VAMAC-G available from Mitsui Dupont Polychemical Kabushiki Kaisha, Japan) were introduced into a kneader called "banbury mixer" in respective proportions as indicated in TABLE 1 below, and were evenly kneaded or mixed together, so as to provide various unvulcanized rubber mixtures.

To 100 parts by weight of each of the unvulcanized rubber mixtures prepared as described above, there were added zinc oxide plus stearic acid as the vulcanization promoting aid, HAF carbon black ("ASTM-N330"), and an aromatic process oil as the softening agent. After all components had been kneaded in the banbury mixer, there were added sulfur as a vulcanizing agent A, hexamethylene diamine carbamate as a vulcanizing agent B, and N-cyclohexyl-2-benzothiazolylsulfenamide as the vulcanization promoting agent in the respective amounts indicated in TABLE 1. Each of the thus obtained mixtures was evenly kneaded with a mixer of roll type, so that various unvulcanized rubber compositions were obtained. The obtained unvulcanized rubber compositions were subjected to a press-molding and -vulcanizing process for concurrent vulcanization of the natural rubber material and the acrylic rubber material, whereby various vulcanized rubber members were obtained as test pieces of Samples 1~3 according to the present invention and Comparative Samples 1 and 2, for performing a durability test and a permanent compressive strain test. The vulcanization was effected for 20 minutes at a temperature of 160° C. for the test pieces to be used for the durability test, and for 30 minutes at a temperature of 160° C. for the test pieces to be used for the permanent compressive strain test. For each of the test pieces according to Samples 1~3 of the present invention, the sizes of particles of the acrylic rubber dispersed within the NR were measured to obtain the average particle size of the acrylic rubber. The obtained particle size of the acrylic rubber in each test piece was confirmed to be about 0.5~3 μm.

The test pieces to be used for the durability test are dumb-bell-shaped test piece (No. 5 type) formed according to JIS-K-6251-1993, "Tensile Test Method of Vulcanized Rubber". The test pieces to be used for the permanent compressive strain test are large pieces according to JIS-K-6262-1997, "Permanent Compressive Strain Test Method of Vulcanized Rubber and Thermoplastic Rubber".

TABLE 1

| Components (parts by weight) | Samples of the Invention | | | Comparative Samples | |
|---|---|---|---|---|---|
|  | 1 | 2 | 3 | 1 | 2 |
| NR | 60 | 80 | 90 | 100 | 50 |
| Acrylic rubber | 40 | 20 | 10 | — | 50 |
| Carbon black | 25 | 25 | 25 | 25 | 25 |
| Softening agent | 10 | 10 | 10 | 10 | 10 |
| Vulcanizing agent A | 1 | 1 | 1 | 1 | 1 |
| Vulcanizing agent B | 0.8 | 0.4 | 0.2 | — | 1 |
| Vulcanization promoting agent | 2 | 2 | 2 | 2 | 2 |
| Vulcanization promoting aid | 5 | 5 | 5 | 5 | 5 |

The test pieces according to Samples 1~3 of the present invention and Comparative Samples 1~2, which were prepared as described above, were subjected to the durability test and the permanent compressive strain test in the following manners.

Durability Test

Each of the test pieces for the durability test was repeatedly subjected to a tensile load by a suitable tensile tester, so as to cause the test piece to undergo a tensile strain of 0~100% in the axial direction 300 times per minute, until the test piece was broken or fractured. The number of times of the tensile strain until the test piece was broken was obtained. The obtained numbers of times are indicated in TABLE 2, as the value indicative of the durability (dumb-bell fatigue) of the test pieces.

Permanent Compressive Strain Test

Each of the test pieces for the permanent compressive strain test was held compressed at a predetermined compression ratio, and at 100° C. for 22 hours, with a suitable compressive device, by a method according to JIS-K-6262-1997, "5. Permanent Compressive Strain Test". Then, the compressive load was removed from each test piece, and the test piece was held at the room temperature for a predetermined cooling time. Then, the thickness of a central portion of each test piece was measured to obtain the permanent compressive strain percentage. The obtained permanent compressive strain percentage value of the test pieces are indicated in TABLE 2.

TABLE 2

|  | Samples of the Invention | | | Comparative Samples | |
|---|---|---|---|---|---|
|  | 1 | 2 | 3 | 1 | 2 |
| Durability: Dumb-bell Fatigue (×10K) | 21 | 8.5 | 7 | 5 | 25 |
| Permanent Compressive Strain (%) | 39 | 35 | 33 | 33 | 50 |

As is apparent from the test result indicated in TABLE 2, the test piece according to Comparative Sample 2, in which the acrylic rubber is included in an amount which does not fall within the specified range of the present invention, has a higher degree of durability than the test piece according to Comparative Sample 1 which does not include the acrylic rubber, but suffers from deterioration of the physical properties required by the vibration damping rubber member, in other words, suffers from a high permanent compressive strain percentage. In contrast, each of the test pieces according to Samples 1~3 of the present invention has enhanced durability and exhibits a sufficiently low permanent compressive strain percentage.

It is apparent from the foregoing description that the vibration damping rubber member according to the present invention exhibits improved durability while assuring the physical properties required by the vibration damping rubber. Accordingly, the present vibration damping rubber member can be made compact, for thereby contributing to reduction of the weight of the automotive vehicles on which the vibration damping rubber member is installed. The method of the present invention permits the produced vibration damping rubber member to exhibit excellent durability.

What is claimed is:

1. A vibration damping rubber member having excellent durability, wherein an improvement comprises:
    the vibration damping rubber member being produced by vulcanizing a composition in which an unvulcanized natural rubber material and an unvulcanized acrylic rubber material are evenly mixed together in a proportion of 90/10~60/40 by weight, and unvulcanized natural rubber material and said unvulcanized acrylic rubber material being mutually incompatible with one another, and fine particles of a vulcanized acrylic rubber having a size of 1~100 μm and produced by vulcanization of said unvulcanized acrylic rubber material being dispersed in a matrix phase of a vulcanized natural rubber produced by vulcanization of said unvulcanized natural rubber material.

2. A vibration damping rubber member according to claim 1, wherein said fine particles of said vulcanized acrylic rubber have a size of not larger than 10 μm.

3. A vibration damping rubber member according to claim 1, wherein said unvulcanized acrylic rubber material consists of a synthetic rubber material having alkyl acrylate as a major component.

4. A vibration damping rubber member according to claim 3, wherein said synthetic rubber material is vulcanized with a polyamine-based vulcanizing agent.

5. A vibration damping rubber member according to claim 4, wherein said polyamine-based vulcanizing agent is hexamethylene diamine carbamate or triethylenetetramine.

6. A vibration damping rubber member according to claim 3, wherein said synthetic rubber material is selected from the group consisting of: a copolymer (ACM) of alkyl acrylate and 2-chloroethyl vinyl ether; a copolymer (ANM) of alkyl acrylate and acrylonitrile; and a copolymer (VAMAC-G) of methyl acrylate and ethylene.

7. A vibration damping rubber member according to claim 1, wherein said unvulcanized natural rubber material is vulcanized with a sulfur-based vulcanizing agent.

8. A method of producing a vibration damping rubber member, said method comprising the steps of:
    preparing an unvulcanized rubber composition by evenly mixing together an unvulcanized natural rubber material and an unvulcanized acrylic rubber material in a proportion of 90/10~60/40 by weight, said unvulcanized natural rubber material and said unvulcanized acrylic rubber material being mutually incompatible with one another, and adding a vulcanizing agent for vulcanizing said unvulcanized natural rubber material and a vulcanizing agent for vulcanizing said unvulcanized acrylic rubber material;

forming a thus obtained mixture into a desired shape; and vulcanizing the formed mixture for obtaining the vibration damping rubber member in which fine particles of a vulcanized acrylic rubber having a size of 0.1~100 μm and produced by vulcanization of said unvulcanized acrylic rubber material are dispersed in a matrix phase of a vulcanized natural rubber produced by vulcanization of said unvulcanized natural rubber material.

9. A method according to claim 8, wherein said fine particles of said vulcanized acrylic rubber have a size of not larger than 10 μm.

10. A method according to claim 8, wherein said unvulcanized acrylic rubber material consists of a synthetic rubber material having alkyl acrylate as a major component.

11. A method according to claim 10, wherein said synthetic rubber material is selected from the group consisting of: a copolymer (ACM) of alkyl acrylate and 2-chloroethyl vinyl ether; a copolymer (ANM) of alkyl acrylate and acrylonitrile; and a copolymer (VAMAC-G) of methyl acrylate and ethylene.

12. A method according to claim 8, wherein said vulcanizing agent for vulcanizing said acrylic rubber material is a polyamine-based vulcanizing agent.

13. A method according to claim 12, wherein said polyamine-based vulcanizing agent is hexamethylene diamine carbamate or triethylenetetramine.

14. A method according to claim 8, wherein said vulcanizing agent for vulcanizing said natural rubber material is a sulfur-based vulcanizing agent.

* * * * *

UNITED STATES PATENT AND TRADEMARK OFFICE
CERTIFICATE OF CORRECTION

PATENT NO.    : 6,465,607 B2
DATED         : October 15, 2002
INVENTOR(S)   : Takehiko Taguchi, Ako Yoshikawa and Shinji Iio It is certified that error appears in the above-identified patent and that said Letters Patent is hereby corrected as shown below:

<u>Column 2,</u>
Line 6, please change "1-100 $\mu$m" to -- 0.1-100 $\mu$m --.

<u>Column 8,</u>
Line 31, please change "1-100 $\mu$m" to -- 0.1-100 $\mu$m --.

Signed and Sealed this

Twenty-ninth Day of April, 2003

JAMES E. ROGAN
*Director of the United States Patent and Trademark Office*